US008135843B2

(12) United States Patent
Kramer

(10) Patent No.: US 8,135,843 B2
(45) Date of Patent: Mar. 13, 2012

(54) METHODS AND SYSTEMS FOR PROVIDING ACCESS TO AN APPLICATION

(75) Inventor: Andre Kramer, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 2243 days.

(21) Appl. No.: 10/104,863

(22) Filed: Mar. 22, 2002

(65) Prior Publication Data

US 2003/0182392 A1    Sep. 25, 2003

(51) Int. Cl.
*G06F 15/16* (2006.01)
(52) U.S. Cl. ............... 709/227; 709/217; 709/245
(58) Field of Classification Search .......... 709/217, 709/219, 227, 245; 719/311, 328, 329
See application file for complete search history.

(56) References Cited

U.S. PATENT DOCUMENTS

| | | | |
|---|---|---|---|
| 4,387,425 A | 6/1983 | El-Gohary | 364/200 |
| 4,779,189 A | 10/1988 | Legvold et al. | 364/200 |
| 4,949,248 A | 8/1990 | Caro | 364/200 |
| 5,031,089 A | 7/1991 | Liu et al. | 364/200 |
| 5,119,319 A | 6/1992 | Tanenbaum | 364/514 |
| 5,155,847 A | 10/1992 | Kirouac et al. | 395/600 |
| 5,175,852 A | 12/1992 | Johnson et al. | 395/600 |
| 5,187,790 A | 2/1993 | East et al. | 395/725 |
| 5,202,971 A | 4/1993 | Henson et al. | 395/425 |
| 5,204,897 A | 4/1993 | Wyman | 380/4 |
| 5,241,625 A | 8/1993 | Epard et al. | 395/163 |
| 5,247,683 A | 9/1993 | Holmes et al. | 395/700 |
| 5,249,290 A | 9/1993 | Heizer | 395/650 |
| 5,305,440 A | 4/1994 | Morgan et al. | 395/200 |
| 5,325,527 A | 6/1994 | Cwikowski et al. | 395/650 |
| 5,329,619 A | 7/1994 | Page et al. | 395/200 |
| 5,367,688 A | 11/1994 | Croll | 395/700 |
| 5,440,719 A | 8/1995 | Hanes et al. | 395/500 |
| 5,457,797 A | 10/1995 | Butterworth et al. | 395/650 |

(Continued)

FOREIGN PATENT DOCUMENTS

DE    19602718 A1    1/1996

(Continued)

OTHER PUBLICATIONS

Venu Vasudevan, "A Web Services Primer", retrieved by the internet at http://www.xml.com/lpt/a/ws/2001/04/04/webservices/index.html., (Jan. 21, 2005), 10 pages, O'Reilly Media, Inc.

(Continued)

*Primary Examiner* — Douglas Blair
(74) *Attorney, Agent, or Firm* — Foley & Lardner LLP; John D. Lanza

(57) ABSTRACT

The invention enables the publishing of a graphical user interface application on the web in a manner so that they can be discovered by manual or automatic searches. The invention includes the step of receiving a service access point (SAP) from a web service directory. The SAP is associated with a first application and identifies a web server. The invention also includes the step of retrieving address information associated with the first application from the web server identified by the SAP and launching a second application. The second application establishes a communication channel with an application server identified by the retrieved address information. The application server subsequently executes the first application and returns information to the second application.

30 Claims, 3 Drawing Sheets

U.S. PATENT DOCUMENTS

| | | | | |
|---|---|---|---|---|
| 5,461,608 | A | 10/1995 | Yoshiyama | 370/16.1 |
| 5,483,466 | A | 1/1996 | Kawahara et al. | 364/514 |
| 5,517,617 | A | 5/1996 | Sathaye et al. | 395/200.1 |
| 5,526,492 | A | 6/1996 | Ishida | 395/200.09 |
| 5,537,548 | A | 7/1996 | Fin et al. | 395/200.04 |
| 5,541,927 | A | 7/1996 | Kristol et al. | 370/94.2 |
| 5,553,242 | A | 9/1996 | Russell et al. | 395/200.12 |
| 5,557,748 | A | 9/1996 | Norris | 395/200.1 |
| 5,561,769 | A | 10/1996 | Kumar et al. | 395/200.05 |
| 5,566,302 | A | 10/1996 | Khalidi et al. | 395/200.09 |
| 5,572,674 | A | 11/1996 | Ernst | 395/200.1 |
| 5,583,563 | A | 12/1996 | Wanderscheid et al. | 348/13 |
| 5,583,992 | A | 12/1996 | Kudō | 395/200.03 |
| 5,586,312 | A | 12/1996 | Johnson et al. | 395/610 |
| 5,592,626 | A | 1/1997 | Papadimitriou et al. | 395/200.09 |
| 5,594,490 | A | 1/1997 | Dawson et al. | 348/6 |
| 5,606,493 | A | 2/1997 | Duscher et al. | 364/134 |
| 5,619,716 | A | 4/1997 | Nonaka et al. | 395/800 |
| 5,625,683 | A | 4/1997 | Nazanin et al. | 379/355 |
| 5,638,513 | A | 6/1997 | Ananda | 395/188.01 |
| 5,644,720 | A | 7/1997 | Boll et al. | 395/200.12 |
| 5,655,218 | A | 8/1997 | Smolinske | 455/566 |
| 5,680,549 | A | 10/1997 | Raynak et al. | 395/200.12 |
| 5,684,861 | A | 11/1997 | Lewis et al. | 379/59 |
| 5,692,183 | A | 11/1997 | Hapner et al. | 395/614 |
| 5,701,451 | A | 12/1997 | Rogers et al. | 395/600 |
| 5,701,484 | A | 12/1997 | Artsy | 395/683 |
| 5,706,437 | A | 1/1998 | Kirchner et al. | 395/200.12 |
| 5,710,918 | A | 1/1998 | Lagarde et al. | 395/610 |
| 5,721,876 | A | 2/1998 | Yu et al. | 395/500 |
| 5,734,865 | A | 3/1998 | Yu | 395/500 |
| 5,737,592 | A | 4/1998 | Nguyen et al. | 395/604 |
| 5,748,892 | A | 5/1998 | Richardson | 395/200.3 |
| 5,754,830 | A | 5/1998 | Butts et al. | 395/500 |
| 5,758,085 | A | 5/1998 | Kouoheris et al. | 395/200.61 |
| 5,761,507 | A | 6/1998 | Govett | 395/684 |
| 5,764,908 | A | 6/1998 | Shoji et al. | 395/200.47 |
| 5,764,915 | A | 6/1998 | Heimsoth et al. | 395/200.57 |
| 5,790,977 | A | 8/1998 | Ezekiel | 702/122 |
| 5,802,258 | A | 9/1998 | Chen | 395/182.08 |
| 5,802,306 | A | 9/1998 | Hunt | 395/200.58 |
| 5,812,784 | A | 9/1998 | Watson et al. | 395/200.57 |
| 5,819,093 | A | 10/1998 | Davidson et al. | 395/704 |
| 5,826,027 | A | 10/1998 | Pedersen et al. | 395/200.51 |
| 5,828,840 | A | 10/1998 | Cowan et al. | 395/200.33 |
| 5,838,910 | A | 11/1998 | Domenikos et al. | 395/200.33 |
| 5,838,916 | A | 11/1998 | Domenikos et al. | 395/200.49 |
| 5,842,195 | A | 11/1998 | Peters et al. | 707/1 |
| 5,842,206 | A | 11/1998 | Sotomayor | 707/5 |
| 5,848,242 | A | 12/1998 | Behaghel et al. | 395/200.48 |
| 5,848,410 | A | 12/1998 | Walls et al. | 707/4 |
| 5,864,678 | A | 1/1999 | Riddle | 395/200.65 |
| 5,870,545 | A | 2/1999 | Davis et al. | 395/200.31 |
| 5,870,552 | A | 2/1999 | Dozier et al. | 395/200.49 |
| 5,881,241 | A | 3/1999 | Corbin | 395/200.68 |
| 5,884,046 | A | 3/1999 | Antonov | 395/200.68 |
| 5,889,942 | A | 3/1999 | Orenshteyn | 395/187.01 |
| 5,898,835 | A | 4/1999 | Truong | 395/200.47 |
| 5,913,060 | A | 6/1999 | Discavage | 395/680 |
| 5,923,842 | A | 7/1999 | Pedersen et al. | 395/188.01 |
| 5,928,324 | A | 7/1999 | Sloan | 709/203 |
| 5,938,733 | A | 8/1999 | Heimsoth et al. | 709/230 |
| 5,941,949 | A | 8/1999 | Pedersen | 709/227 |
| 5,941,988 | A | 8/1999 | Bhagwat et al. | 713/201 |
| 5,949,975 | A | 9/1999 | Batty et al. | 395/200.43 |
| 5,951,694 | A | 9/1999 | Choquier et al. | 714/15 |
| 5,960,409 | A | 9/1999 | Wexler | 705/14 |
| 5,961,586 | A | 10/1999 | Pedersen | 709/203 |
| 5,961,588 | A | 10/1999 | Cooper et al. | 709/203 |
| 5,968,132 | A | 10/1999 | Tokunaga et al. | 709/247 |
| 5,973,696 | A | 10/1999 | Agranat et al. | 345/357 |
| 5,983,190 | A | 11/1999 | Trower, II et al. | 704/276 |
| 5,999,179 | A | 12/1999 | Kekic et al. | 345/349 |
| 6,014,133 | A | 1/2000 | Yamakado et al. | 345/199 |
| 6,023,721 | A | 2/2000 | Cummings | 709/201 |
| 6,038,596 | A | 3/2000 | Baldwin et al. | 709/219 |
| 6,067,568 | A | 5/2000 | Li et al. | 709/223 |
| 6,088,515 | A * | 7/2000 | Muir et al. | 709/217 |
| 6,108,712 | A | 8/2000 | Hayes, Jr. | 709/246 |
| 6,125,387 | A * | 9/2000 | Simonoff et al. | 709/218 |
| 6,131,116 | A | 10/2000 | Riggins et al. | 709/219 |
| 6,157,944 | A | 12/2000 | Pedersen | 709/204 |
| 6,167,432 | A | 12/2000 | Jiang | 709/204 |
| 6,185,609 | B1 | 2/2001 | Rangarajan et al. | 709/219 |
| 6,256,666 | B1 | 7/2001 | Singhal | 709/217 |
| 6,263,363 | B1 | 7/2001 | Rosenblatt et al. | 709/217 |
| 6,263,377 | B1 | 7/2001 | Monday et al. | |
| 6,272,556 | B1 | 8/2001 | Gish | 709/315 |
| 6,289,461 | B1 | 9/2001 | Dixon | 713/201 |
| 6,338,086 | B1 | 1/2002 | Curtis et al. | 709/218 |
| 6,409,602 | B1 * | 6/2002 | Wiltshire et al. | 463/42 |
| 6,446,109 | B2 * | 9/2002 | Gupta | 709/203 |
| 6,567,852 | B2 * | 5/2003 | Besaw et al. | 709/228 |
| 6,643,690 | B2 | 11/2003 | Duursma et al. | |
| 6,654,784 | B1 * | 11/2003 | Wei | 709/203 |
| 6,792,605 | B1 * | 9/2004 | Roberts et al. | 719/313 |
| 6,912,582 | B2 * | 6/2005 | Guo et al. | 709/229 |
| 6,928,469 | B1 | 8/2005 | Duursma et al. | |
| 6,961,760 | B2 * | 11/2005 | Li et al. | 709/219 |
| 6,986,040 | B1 * | 1/2006 | Kramer et al. | 713/155 |
| 7,000,019 | B2 * | 2/2006 | Low et al. | 709/227 |
| 7,028,025 | B2 * | 4/2006 | Collins | 707/3 |
| 7,237,114 | B1 * | 6/2007 | Rosenberg | 713/176 |
| 7,266,582 | B2 * | 9/2007 | Stelting | 709/201 |
| 7,296,022 | B2 * | 11/2007 | Harjanto | 707/10 |
| 7,340,772 | B2 * | 3/2008 | Panasyuk et al. | 726/15 |
| 7,359,953 | B2 * | 4/2008 | Muir et al. | 709/217 |
| 2001/0007995 | A1 | 7/2001 | Makino | 709/219 |
| 2001/0052932 | A1 | 12/2001 | Young, Jr. et al. | 348/96 |
| 2001/0056547 | A1 | 12/2001 | Dixon | 713/200 |
| 2002/0035451 | A1 | 3/2002 | Rothermel | 703/1 |
| 2003/0014326 | A1 * | 1/2003 | Ben-Meir et al. | 705/26 |
| 2004/0139117 | A1 * | 7/2004 | Muir et al. | 707/104.1 |
| 2005/0198380 | A1 * | 9/2005 | Panasyuk et al. | 709/239 |

FOREIGN PATENT DOCUMENTS

| | | |
|---|---|---|
| EP | 0 381 645 A2 | 8/1990 |
| EP | 0 384 339 A2 | 8/1990 |
| EP | 0 414 624 A2 | 2/1991 |
| EP | 0 475 581 A2 | 3/1992 |
| EP | 0 540 151 A2 | 5/1993 |
| EP | 0 540 151 A3 | 5/1993 |
| EP | 0 648 038 A2 | 4/1995 |
| EP | 0 818 753 A2 | 1/1996 |
| EP | 0 767 563 A2 | 4/1997 |
| EP | 0 841 615 A2 | 5/1998 |
| EP | 0 878 759 A1 | 11/1998 |
| EP | 1 321 853 A2 | 6/2003 |
| GB | 2323946 A | 10/1998 |
| WO | WO 93/15457 A1 | 8/1993 |
| WO | WO 94/14114 A1 | 6/1994 |
| WO | WO 97/28623 A3 | 8/1997 |
| WO | WO 98/52320 A2 | 11/1998 |
| WO | WO 99/22332 | 5/1999 |
| WO | WO 01/55813 | 8/2001 |
| WO | WO 02/093289 A3 | 11/2002 |

OTHER PUBLICATIONS

Satya Komatineni, "Understanding UDDI and JAXR", retrieved by the internet at http://www.onjava.com/lpt/a/1570, (Jan. 19, 2005), 11 pages, O'Reilly Media, Inc.

Patents Act 1977 Examination Report under Section 18(3), Re: Application No. GB0422889.6, (Jan. 31, 2005), 3 pages, Issued by the United Kingdom, The Patent Office.

PCT International Search Report for PCT/US03/08434.

Patents Act 1977 Examination Report under Section 18(3), Re: Application No. GB0422889.6, (Jan. 9, 2006), 2 pages, issued by the United Kingdom Patent Office.

Great Britain Office Action, dated Jul. 1, 2005, in App. No. GB0422889.6.

Great Britain Notification of Grant, dated Aug. 1, 2006, in App. No. GB0422889.6.

Great Britain Certificate of Grant of Patent, dated Aug. 30, 2006, in App. No. GB0422889.6.

"Allocation of Equivalent Communication Buffer Sizes in SQLJRA Remote Protocol", *IBM Technical Disclosure Bulletin*, vol. 36, No. 1, Jan. 1, 1993, pp. 29-31.

Liu et al. "Efficient Algorithms for Resource Allocation in Distributed and Parallel Query Processing Environments", The 9th International Conference on Distributed Computing Systems, Newport Beach, California, Jun. 5, 1989.

"OS/2 EE Database manager SQLJRA Remote Protocol", *IBM Technical Disclosure Bulletin*, vol. 36, No. 1, pp. 33-36 Jan. 1993.

Mann, Bruce E. et al., "Terminal Servers on Ethernet Local Area Networks," Digital Technical Journal No. 3, pp. 73-87 (Sep. 1986).

*Windows NT Networking Guide: Microsoft Windows NT Resource Kit*, pp. 79-87, Microsoft Press 1995.

Schemers, R.J., III, "lbnamed: a load balancing name server written in Perl—Update," available at http://www-leland.stanford.edu/~docs/ibnamed/ibnamed.html, pp. 1-5, Sep. 17, 1995.

Droms, "Dynamic Host Configuration Protocol," *Network Working Group Request for Comments: 1541*, Oct. 1993, pp. 1-39.

Adler, "Distributed Coordination Models for Client/Server Computing", *Computer Magazine*, Apr. 1995, pp. 14-22.

Prasad, Shashi, "Weaving a Thread", *Byte*, (Oct. 1995) pp. 173-174.

Coulouris, et al. *Distributed Systems Concepts and Design*, 2nd ed., Addison-Wesley, 1994.

Campbell A., et al.: "Meeting End-To-End QOS Challenges for Scaleable Flows in Heterogeneous Multimedia Environments" High Performance Networking 6, IFIP 6th International Conference on High Performance Networking (HPN). Palma De Mallorca, Sep. 13-15, 1995, No. Conf. 6, Sep. 11, 1995, pp. 101-114, XP000624330 Puigjaner R. (ED).

"IP Multicast Streamlines Delivery of Multicast Applications", http://www.cisco.com/warp/public/674/4.htr, Mar. 3, 1995, pp. 1-5.

"Multicast Routing", http://www.cisco.com/wrap/public/614/17.htr, Aug. 3, 1995, pp. 1-4.

Andrew S. Tanenbaum, "Modern Operating Systems", Prentice Hall, Inc. 1992.

IBM Technical Disclosure Bulletin, "Remote Desktop Environments Reflected in Local Desktop Windows", vol. 36 No. 3, Mar. 1993, pp. 421-426.

Eckhart Koppen et al "A practical approach towards active hyperlinked documents", Computer Networks and ISDN Systems 30 (1998) pp. 251-258.

Michael Jem, "'Thin' vs. 'Fat'" Visualization Client, 1998 IIEE, pp. 772-788.

Freeman H., "A Scheme for the Efficient Encoding of Graphical Data for communication and Information Processing", Proceedings of the Electronics Congress—Advance in Electronics, Rassegna, IT, pp. 340-348, Mar. 24, 1969.

Freeman, H., "Computer Processing of Line-Drawing Images", ACM Computing Surveys, New York, NY, US, vol. 6, No. 1, pp. 57-97, Mar. 1974.

\* cited by examiner

METHODS AND SYSTEMS FOR PROVIDING ACCESS TO AN APPLICATION

FIELD OF THE INVENTION

The present invention relates generally to publishing web services on the web and, more specifically, to providing access to an application using a web service directory.

BACKGROUND OF THE INVENTION

Many companies having web sites on the World Wide Web enrich the experience of visiting their sites by using content from other service providers or web sites. For instance, a web portal can integrate numerous services from other web sites, such as travel information and search capabilities. The supplier of these services, such as the particular travel company providing the travel information, can benefit from greater exposure and/or an increase in income. The integration of these services, also called web services, typically enables the web portal to offer more services to its users.

Referring to FIG. 1, a computer system 100 known to the prior art typically includes a client computer 105, or client, a content server 110, and a web server 115. The client 105 is typically a personal computer that can download content from the content server 110 and/or web server 115 over a network 120, such as the Internet or World Wide Web. The client 105 is typically in communication with the content server 110 over a client-content server communication channel 130. Moreover, the client 105 is typically in communication with the web server 115 over a client-web server communication channel 135.

The client 105 may also include a web browser 140, such as INTERNET EXPLORER developed by Microsoft Corporation in Redmond, Wash. or NETSCAPE NAVIGATOR developed by Netscape Communications Corporation of Mountain View, Calif., to connect to the web and/or download content from the servers 110, 115. A conventional content server 110 hosts one or more programs or files that can be accessed by the client 105. The web server 115 typically delivers web pages to the client 105 (e.g., web browser 140).

To advertise web services, firms or companies can publish their services on the web using the content server 110. As more and more web services are written, a central repository (i.e., depository) for public web services, or a web service directory 145, is typically stored on the content server 110. The web service directory 145 may include a table listing supported web services and may also include documentation for each listed web service.

One example of the web service directory 145 includes the Universal Description, Discovery, and Integeration (UDDI) registry, jointly developed by Microsoft Corporation of Redmond, Wash., International Business Machines Corporation of Armonk, N.Y., and Ariba Inc. of Sunnyvale, Calif. Web services can alternatively be published on the web service directory 145 using the Lightweight Directory Access Protocol (LDAP), Microsoft's ACTIVE DIRECTORY, developed by Microsoft Corporation of Redmond, Wash., Common Object Request Broker Architecture (CORBA) name service, or ebXML service registry developed by the Organization for the Advancement of Structured Information Standards (OASIS) of Billerica, Mass.

A potential user of the conventional web service uses the client 105 to access the web service directory 145. The client 105 typically accesses the web service through a programming interface. For example, the service may be encoded by an interface description language, such as Web Services Description Language (WSDL). Alternatively, the client 105 may access the web service through a web page or a web page address (i.e., a Uniform Resource Locator, or URL).

There are several drawbacks to using the conventional techniques of accessing a web service. Programmatic service interfaces, for instance, typically require client-side applications (having client-side application logic) to be developed by the supplier of the web service to ensure that the client 105 can properly execute the web service through its interface. Moreover, web pages typically require an application to have a web user interface (UI) to access the web page. A web UI can limit the amount of interactivity between a user of the client 105 and the web page. For example, the amount of interactivity can be limited by delays in loading the next screen or object. Additionally, using a web UI for the execution of an application may constrain the complexity of the interface.

Therefore, there is a need to access web services in a more user-friendly manner, such as by providing greater interactivity between the client 105 and the web service and less dependence on suppliers of web services for applications to correctly execute with the web service.

SUMMARY OF THE INVENTION

The invention relates to methods and systems for providing access to a graphical user interface (GUI) application using web services. Providing access to, or publishing, a GUI rather than a web UI or a programming service interface has several benefits to the user of a client. For example, using a GUI to access a web service can provide a more powerful interface than a web UI and a more user-friendly environment. Additionally, using a GUI can provide a general UI to a user of the client compared to different web UIs for different web pages. Further, an application executing with the GUI does not need client-side application logic to properly execute on the client.

In one aspect, a method for remoting an application to an application client or end user application includes the step of receiving a service access point (SAP) from a web service directory. The SAP is associated with a first application and identifies a web server. The method also includes retrieving address information associated with the first application from the web server identified by the SAP and launching a second application. The second application establishes a communication channel with an application server identified by the retrieved address information.

In one embodiment, the method also includes the step of transmitting a query to the web service directory to search for the first application. The method can also include receiving the address of the web server and receiving a key for locating information associated with the first application in a database. In another embodiment, the step of retrieving address information from the web server also includes the step of retrieving a Multipurpose Internet Mail Extensions (MIME) document including the address information.

In another aspect, a client for use with executing a remote first application provided by a service provider on a web service directory includes a client browser. The client browser receives a SAP associated with the first application from the web service directory. The SAP identifies a web server. The client browser also retrieves address information associated with the first application from the web server identified by the SAP. The client also includes an application client that is launched in response to the retrieved address information. The application client also establishes a communication channel with an application server identified by the retrieved address information to receive data from the first application.

In another aspect, a method for remoting an application to an application client or end user application includes the steps of sending a query to a web service directory for information associated with a first application and transmitting a SAP associated with the first application to the client from the web service directory. The SAP identifies a web server. The method also includes the steps of retrieving address information associated with the first application from the web server identified by the SAP and launching a second application by the client. The second application establishes a communication channel with an application server identified by the retrieved address information. The method additionally includes the step of launching the first application by the application server and returning information to the second application. In one embodiment, the method additionally includes accessing a local database using a key contained within the SAP and having the local database return address information associated with the first application.

In yet another aspect, a method for remoting an application to an application client or end user application includes the step of receiving a request to access a SAP from a client. The SAP is associated with a first application. The method also includes identifying that the requested SAP can be used with an application client and retrieving address information associated with the first application identified by the SAP. The method additionally includes the step of converting the retrieved address information into a file where the format of the file is associated with the application client. The method also includes transmitting the file including the converted address information to the client.

In one embodiment, the SAP is identified in a web service directory. In other embodiments, the method includes transmitting the SAP associated with the first application to the client from the web service directory. In some embodiments, the method includes launching an application client by the client. The application client may also establish a communication channel with an application server identified by the retrieved address information.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

FIG. 2 is a block diagram of an embodiment of a computer system having a publishing server plug-in.

DETAILED DESCRIPTION OF THE INVENTION

Figure 1:
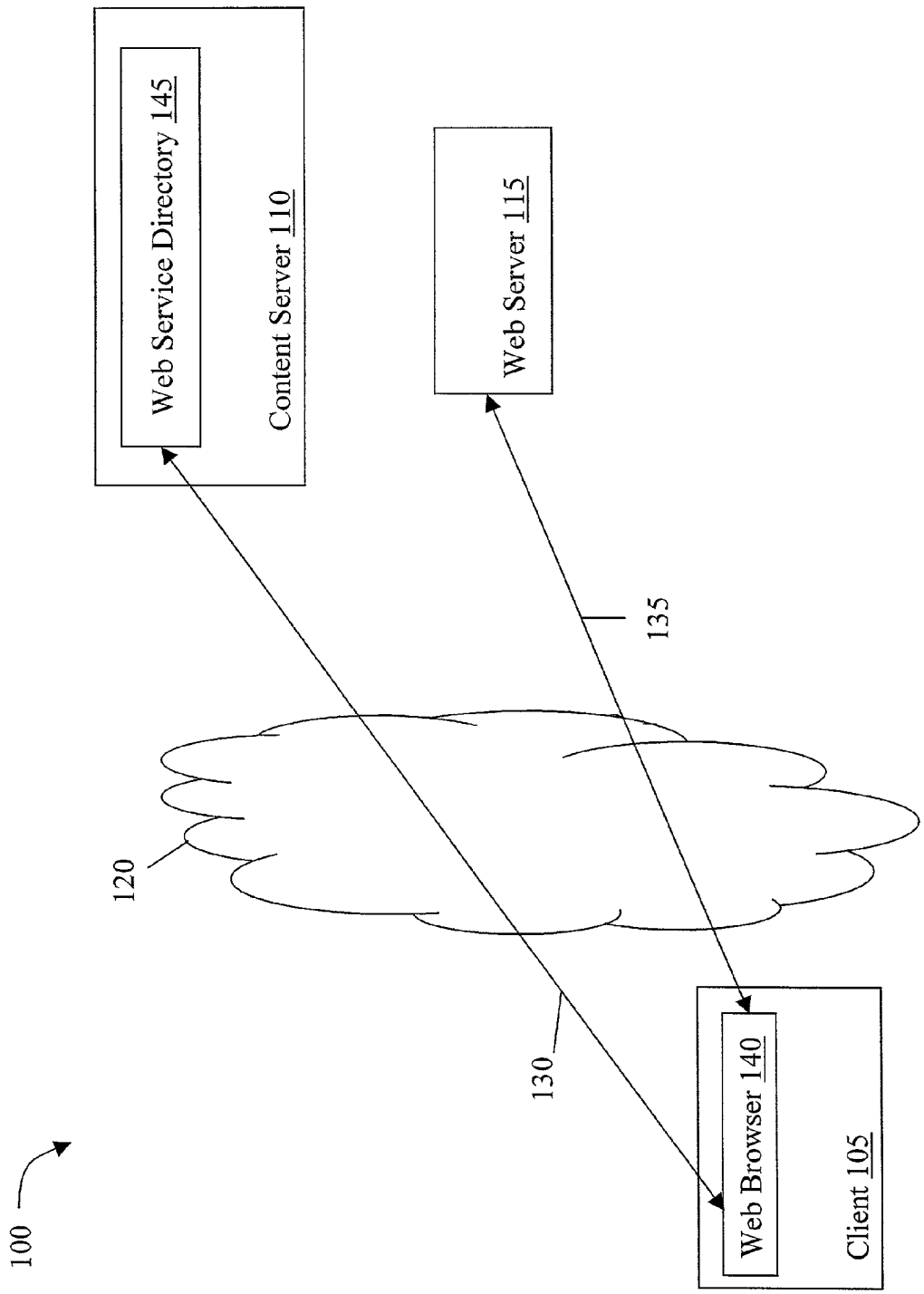
FIG. 1 is a block diagram of an embodiment of a prior art computer system.
Figure 2:
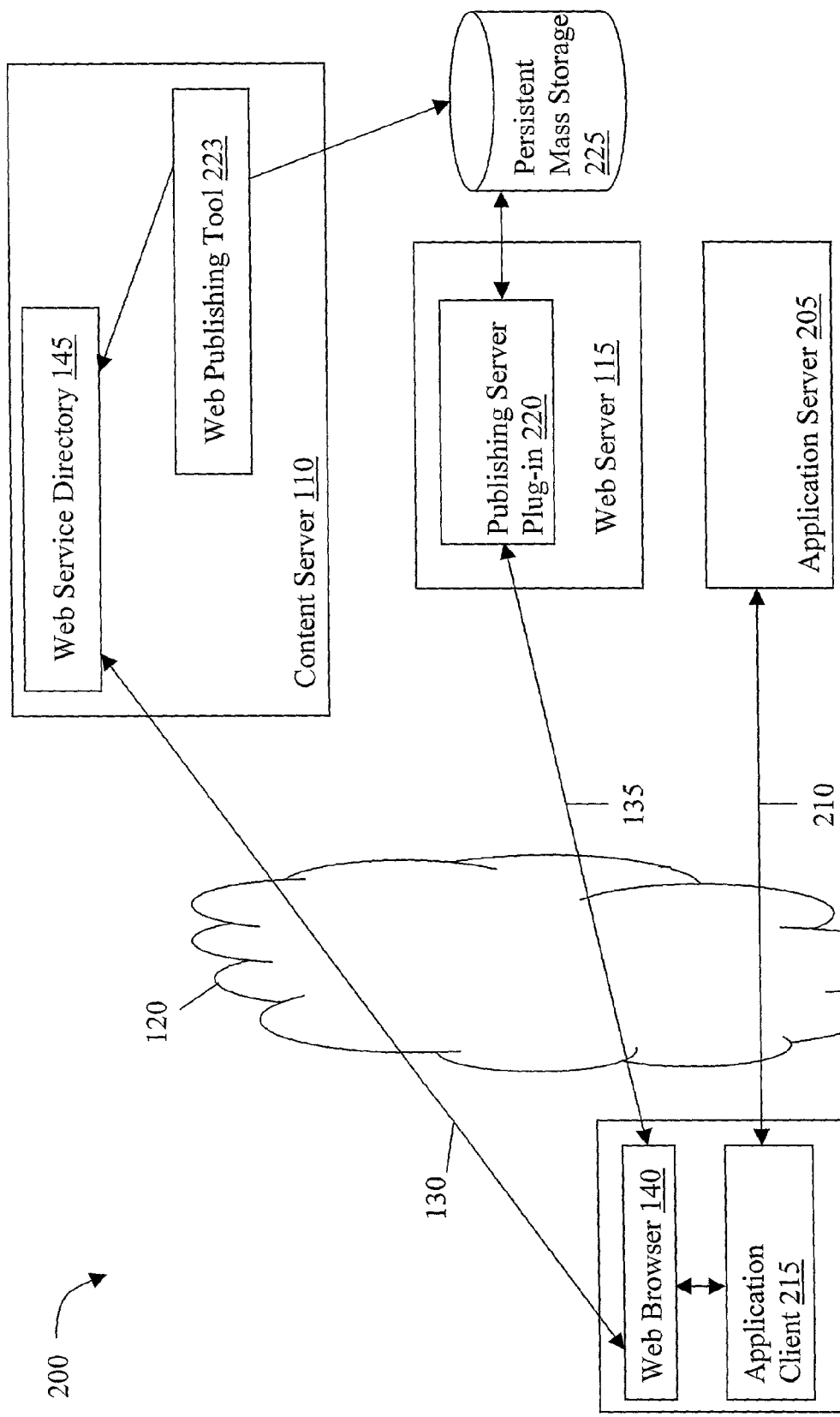

Referring to FIG. 2, an embodiment of a computer system 200 enabling the publishing of GUIs in a web service directory includes the client 105, the content server 110, the web server 115, and an application server 205. The client 105 can download content from the content server 110, the web server 115, and the application server 205 over the network 120. In one embodiment, the client 105 can download content (e.g., an application) from the application server 205 over a client-application server communication channel 210.

Although illustrated with three servers 110, 115, 205, any number of servers can be used to implement the functions described above and below. In one embodiment, two or more of the servers 110, 115, 205 are aggregated together and provided as a single physical machine. Moreover, any number of clients 105 can be connected to the servers 110, 115, 205 to implement the functions described above and below.

The client 105 can be any personal computer (e.g., based on a microprocessor from the x86 family, the Pentium family, the 680x0 family, PowerPC, PA-RISC, MIPS families), smart or dumb terminal, network computer, wireless device, information appliance, workstation, minicomputer, mainframe computer or other computing device. Operating systems supported by the client 105 can include any member of the WINDOWS family of operating systems from Microsoft Corporation of Redmond, Wash., MacOS, JavaOS, and various varieties of Unix (e.g., Solaris, SunOS, Linux, HP-UX, A/IX, and BSD-based distributions).

In one embodiment, the web browser 140 uses Secure Socket Layer (SSL) support for communications to the content server 110 and/or the web server 115. SSL is a secure protocol developed by Netscape Communication Corporation of Mountain View, Calif., and is now a standard promulgated by the Internet Engineering Task Force (IETF). The web browser 140 can alternatively connect to the content server 110 and/or the web server 115 using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF.

Additionally, the client 105 includes an application client 215 for establishing and exchanging communications with the application server 205 over the client-application server communication channel 210. In one embodiment, the application client 215 is a GUI application. In some embodiments, the application client 215 is an Independent Computing Architecture (ICA) client, developed by Citrix Systems, Inc. of Fort Lauderdale, Fla., and is also referred to below as ICA client 215. Other embodiments of the application client 215 include a Remote Display Protocol (RDP) client, developed by Microsoft Corporation of Redmond, Wash., a client-side player, interpreter or simulator capable of executing multimedia applications, email, Java, or .NET code. Moreover, in one embodiment the output of an application executing on the application server 205 can be displayed at the client 105 via the ICA client 215.

The client 105 searches the web service directory 145 for a web service. In one embodiment, the search is a manual search. Alternatively, the search is an automatic search. The web service directory 145 may also provide a service based view, such as white and yellow pages, to search for web services in the web service directory. In another embodiment, the web service directory 145 supports a hierarchical browsing based on a structured service name and service kind for GUI applications. In one embodiment, the web service directory 145 executes on a server independent of the content server 110, such as a directory server. In other embodiments, the web service directory 145 executes on multiple servers.

In some embodiments, the content server 110 enables the client 105 to select web services based on additional analysis or information by providing this information or analysis in the web service directory 145. Examples of service information that the web service directory 145 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the client 105 must use to access the web service. For instance, the service type can state that the service is encoded by an interface description language, such as Web Services Description Language (WSDL).

The service access point, or SAP, is a unique address for an application. The SAPs enable the computer system 200 to support multiple applications at the client 105 and each server 110, 115, 205. For example, the application server 205 may support an electronic mail (i.e., e-mail) application, a file transfer application, and/or a GUI application. In one embodiment, these applications would each have a SAP that is unique within the application server 205. In one embodiment, the SAP is a web or Internet address (e.g., Domain Name System (DNS) name, IP/port, or Uniform Resource Locator (URL)). Thus, in one embodiment the SAP identifies the address of the web server 115 as part of the address for an application stored on the web server 115. In some embodiments, the SAP identifies the address of a publishing server plug-in 220 as part of the address for an application stored on the web server 115, as described below. In one embodiment, the SAP is an "accessPoint" from the UDDI registry.

To prepare an item for publishing in the web service directory 145, the content server 110 includes a web publishing tool 223. In one embodiment, the web publishing tool 223 is a software module. Alternatively, the web publishing tool 223 is another server that may be externally located from or internally located in the content server 110.

In one embodiment, the web server 115 delivers web pages to the client 105. The web server 115 can be any personal computer (e.g., based on a microprocessor from the x86 family, the 680x0 family, the Pentium family, PowerPC, PA-RISC, MIPS families), Windows-based terminal, network computer, wireless device (e.g., cellular phone), information appliance, X-device, workstation, mini computer, main frame computer, personal digital assistant, or other communications device capable of providing web pages to the client 105.

In another embodiment, the web server 115 is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 115 also includes a publishing server plug-in 220 to enable the publishing of graphical user interface (GUI) applications. More specifically, the publishing server plug-in 220 translates a new web service entry URL into a GUI application service so that the GUI can be accessed via the web service directory 145. In one embodiment, the publishing server plug-in 220 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 220 is a Java Server Page (JSP). Using the publishing server plug-in 220 to facilitate the publishing of remote GUI applications, the client 105 can thereby access the web service, not through a programming interface or a web page, but through a full GUI interface, such as with Citrix's ICA or Microsoft's RDP.

The application server 205 hosts one or more applications that are available for the client 105. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

The network 120 can be a local-area network (LAN), a wide area network (WAN), or a network of networks such as the Internet or the World Wide Web (i.e., web). In other embodiments, one or more of the communication channels 130, 135, 210 are established over different networks. For example, the client-content server communication channel 130 can belong to a first network (e.g., the World Wide Web) and the client-web server communication channel 135 can belong to a second network (e.g., a secured extranet or Virtual Private Network (VPN)).

Example embodiments of the communication channels 130, 135, 210 include standard telephone lines, LAN or WAN links (e.g., T1, T3, 56 kb, X.25), broadband connections (ISDN, Frame Relay, ATM), and wireless connections. The connections over the communication channels 130, 135, 210 can be established using a variety of communication protocols (e.g., HTTP, HTTPS, TCP/IP, IPX, SPX, NetBIOS, Ethernet, RS232, messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., manufacturing message specification (MMS) protocol, and direct asynchronous connections).

In one embodiment, the web publishing tool 223 stores information about an application that the web publishing tool 223 is publishing in the web service directory 145 in a persistent mass storage 225. As discussed below, in one embodiment the information is a URL for the dynamic publishing server plug-in 220. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the servers 110, 115, 205.

Figure 3:
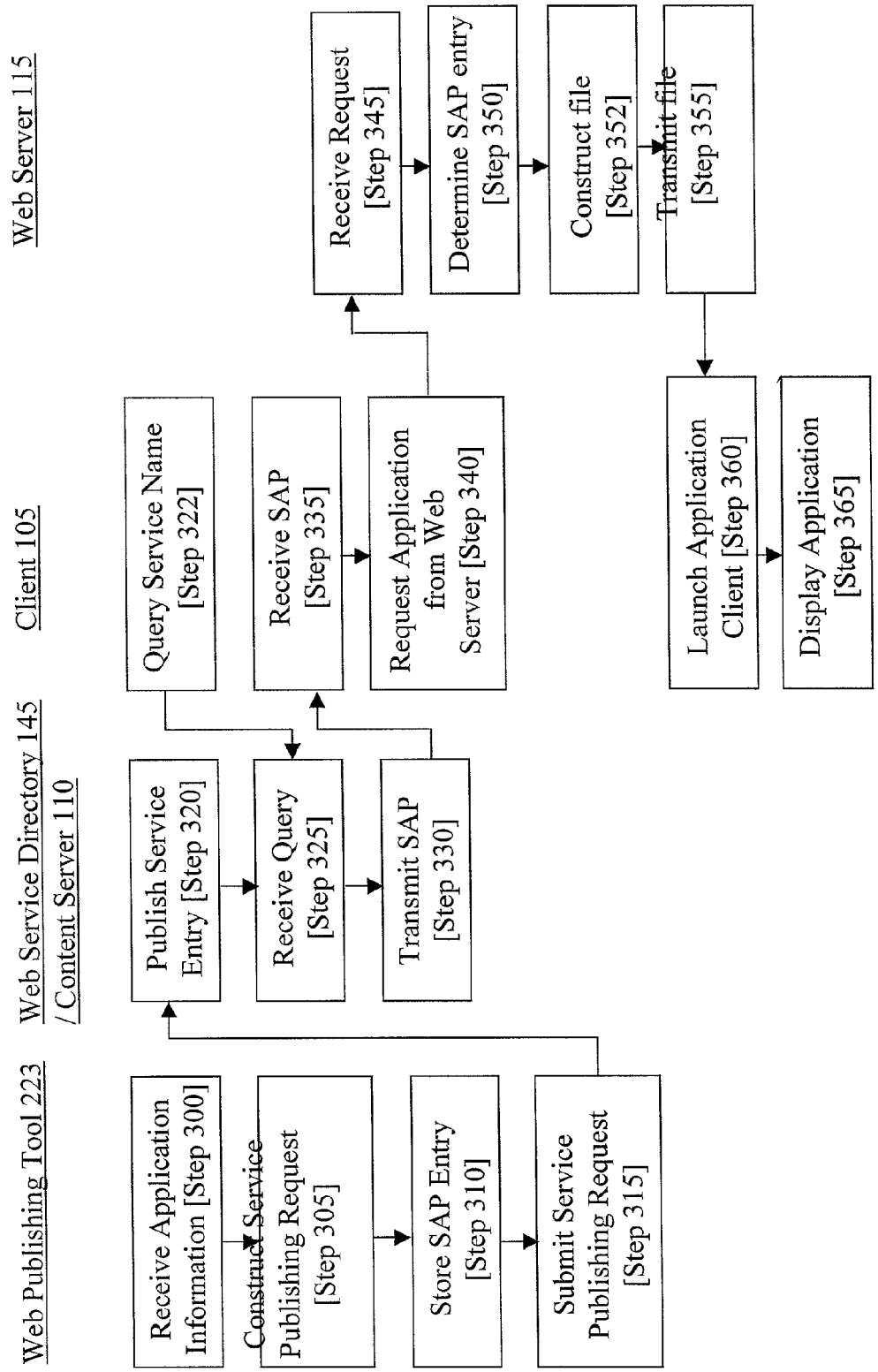
FIG. 3 is a flow diagram illustrating an embodiment of the operation of the computer system of FIG. 2.

Referring to FIG. 3, the web publishing tool 223 receives a web service description and access information for an application (e.g., GUI application) for publishing (step 300). In one embodiment, the web service description includes the service information described above (e.g., the name of the business offering the web service, the service type, a textual description of the service, and a SAP). The access information may include, for example, a published application name, a Transmission Control Protocol (TCP) browsing server farm address, and a MetaFrame server IP address. In some embodiments, the access information specifies the address to use and a ticket to use to traverse network or security gateways or bridge devices.

The web publishing tool 223 then constructs a service-publishing request to request the publication of the web service (i.e., GUI application) (step 305). In one embodiment, the service-publishing request includes a SAP. In some embodiments, the SAP is a URL including the web address of the web server 115 and the publishing server plug-in 220. Further, the web address can be a Uniform Resource Identifier (URI), which is the generic term for the types of names and addresses that refer to objects on the web. A URL is one kind of URI. An example of the URI is the name of the web server 115 (e.g., "web-server") and the CGI script name (e.g., "dynamic-component") for the publishing server plug-in 220.

The web publishing tool 223 stores a SAP entry associated with the SAP in the persistent mass storage 225 (step 310). In some embodiments, the web publishing tool 223 also associates published application information (e.g., ICA-published-app-info) with the GUI application. In further embodiments, the web publishing tool 223 also includes a key in the service-publishing request to identify the SAP entry that the content server 110 stores in the persistent mass storage 225. For instance, the key can have the value of "123456677." An example of a SAP identifying the web server 115, the CGI script name of the publishing server plug-in 220, and the key described above is "http://web-server/dynamic-component/?app=123456677."

An example of the SAP entry associated with the SAP described above is "key=123456677, value=ICA-published-app-info." The key can be any length (e.g., 56 bit key, 128 bit key). In one embodiment, the key is a cryptographic random number. The key may also provides an access right to the key holder. Although illustrated with a key, any means can be used to provide a form of security to the SAP entry stored in the persistent mass storage 225.

The web publishing tool 223 then provides the service-publishing request to the content server 110 for publishing in the web service directory 145 (steps 315 and 320). Moreover, in one embodiment, the content server 110 transmits the key of the SAP to the client 105 requesting the particular web service for subsequent use in locating the SAP entry. In one embodiment, the publishing of the service-publishing request enables users of the client 105 to access the service. In one embodiment, GUI applications are published on the web service directory 145 using NFUSE developed by Citrix Systems, Inc. of Fort Lauderdale, Fla. In some embodiments, a publisher of a GUI application customizes the publication of the GUI application on the web service directory 145 using Application Launching And Embedding (ALE), also developed by Citrix Systems, Inc. ALE enables the launching of a GUI application from or the embedding of the application into an HTML page.

The client 105 then queries a service name from the web service directory 145 (step 322). The content server 110 receives the query from the client 105 (step 325) and finds the requested service name in the web service directory 145. In another embodiment, the user of the client 105 navigates the web service directory 145 until locating a particular service name that the user of the client 105 was attempting to find. Although illustrated with the client 105, any web service directory client (e.g., UDDI client or LDAP browser) can query or navigate the web service directory 145 to discover published web services.

Upon location of the SAP associated with the received query, the content server 110 transmits the SAP to the client 105 (step 330). The client 105 receives the SAP (step 335) and determines the address of the publishing server plug-in 220 from the SAP. The client 105 subsequently transmits a request for the GUI application to the web server 115 (step 340). In some embodiments, the request from the client 105 is an HTTP request transmitted from the web browser 140 to the web server 115. In other embodiments, an application (e.g., general directory browser or HTML UI) executing on the client 105 receives the SAP from the content server 110 and provides the SAP as an argument to the web browser 140. The web browser 140 may then automatically transmit an HTTP request (for the GUI application) to the web server 115.

Following along the lines of the previous examples, a particular example of the application request to the web server 115 is "http://web-server/dynamic-component/?app=123456677)."

The web server 115, and, more particularly, the publishing server plug-in 220, receives the application request associated the SAP (step 345) and determines the SAP entry associated with the request (step 350). In one embodiment, the publishing server plug-in 220 receives the request from the client 105 and retrieves the published application information associated with the request that had been stored (as part of the SAP entry) in the persistent mass storage 225. In some embodiments, the publishing server plug-in 220 uses the SAP (or part of the SAP) that the client 105 received from the content server 110 as the key to access the proper service entry (e.g., the published application information) stored in the persistent mass storage 225.

The publishing server plug-in 220 then constructs a file or document having the published application information (e.g., HTTP address of the application server 205) (step 352) and transmits this document to the client 105 (step 355). The publishing server plug-in 220 constructs the file so that the file has a format compatible with the application client 215. In one embodiment, the document is a Multipurpose Internet Mail Extensions (MIME) or a secure MIME (S/MIME) document. In another embodiment, the document is an HTML document containing an ICA web client embedded object HTML tag.

The web browser 140 subsequently receives the document and attempts to open the document. In one embodiment, if the application client 215 is not installed on the client 105, the client 105 communicates with the application server 205 to download and install the application client 215. Upon installation of the application client 215 or, alternatively, if the application client 215 has already been installed on the client 105, the client 105 launches the application client 215 to view the document received from the web server 115 (step 360).

Once the application client 215 is installed and executing on the client 105, the application server 120 then executes the application and displays the application on the application client 215 (step 365). In another embodiment, the client 105 views the document (even before launching the application client 215) and uses the information in the document to obtain the GUI application from the application server 205. In this embodiment, the display of the GUI application includes the installation and execution of the application client 215. Moreover, the viewing of the document may be transparent to the user of the client 105. For example, the client 105 may receive the document from the web server 115 and interpret the document before automatically requesting the GUI application from the application server 205.

Authentication to the application server 205 can be done in any number of ways. For example, the user can be required to provide a password that the application server 205 verifies is correct. In other embodiments, a "ticket authority" generates one or more tickets for use by the client 105 to authenticate the client 105 to the application server 205.

In one embodiment, an email is sent to potential service users directing the user to view the web service directory 145. For instance, if an organization updates the web service directory 145 and consequently wants to direct users to the company's update, the organization may send an email to potential service users to advertise the update.

Thus, the application client 215 provides service-based access to published applications, desktops, desktop documents, and any other application that is supported by the application client 215. Examples of applications that the application client 215 can provide access to include, but are not limited to, the WINDOWS desktops, WINDOWS documents such as MICROSOFT EXCEL, WORD, and POWERPOINT, all of which were developed by Microsoft Corporation of Redmond, Wash., Unix desktops such as SUN SOLARIS developed by Sun Microsystems of Palo Alto, Calif., and GNU/Linux developed by Red Hat, Inc. of Durham, N.C.

An organization or firm using a corporate portal, such as XPS developed by Citrix Systems, Inc. of Fort Lauderdale, Fla., to provide users (e.g., employees, suppliers, partners, and customers) with a collection of information associated with the organization or firm may benefit from the publishing of GUI applications. In more detail and in some embodiments, the computer system 200 supports role-based access control for additional security. A role describes a particular group of users who can access certain content and applications within the portal. As users log onto the portal, the presentation they see is generated depending upon their roles.

By defining roles, a portal administrator can control and present information that is most relevant to the group's job function. Thus, the computer system 200 can provide users having a certain role access to particular GUI applications (and/or application information). Moreover, the computer system 200 may support subscription-based access to GUI applications (and/or application information) where, for example, a customer pays a subscription fee each month to access published GUI applications.

For example, an employee of an organization creates a report of results of a test conducted over a six month period in a spreadsheet program, such as "Spreadsheet X" (e.g., MICROSOFT EXCEL), using a desktop computer. The desktop has the most current version of Spreadsheet X available, which was the version used to create the report. The employee then departs on a business trip. Before leaving, the employee knows that, upon return from the business trip, the employee has to present the report to the organization's customer (e.g., another organization) at the customer's site. Thus, the employee saves the report onto a disk before his departure. Upon return, the employee travels to the customer's site. The employee then realizes that the customer's machines only support a previous version of Spreadsheet X. Because the employee used some of the new features of the latest version of Spreadsheet X in the report, the employee would prefer not to use an earlier version of the software.

The developer of Spreadsheet X recently released the latest version of Spreadsheet X. To attract customers and increase the user-base of Spreadsheet X, the developer publishes Spreadsheet X on the web service directory 145. For instance, the developer's application server 205 transmits Spreadsheet X and web service publishing information about Spreadsheet X (e.g., developer's name, web address of developer's application server 205) to the content server 110. The content server 110 uses this information to create a service publishing request for the Spreadsheet X, such as "http://web-server/dynamic-component/SpreadsheetX=987654321," stores an associated SAP entry in a local database (i.e., persistent mass storage 225), and publishes the service publishing request in the web service directory 145.

Instead of traveling back to his office and wasting valuable time, the employee can use the customer's computer (i.e., the client 105) to display the latest version of Spreadsheet X on the customer's computer for his presentation. First, the employee connects the customer's computer to the web. Once connected, the employee queries the content server 110 for the current version of Spreadsheet X. The customer's computer then receives the associated SAP, which is the address of the publishing server plug-in 220, from the content server 110. The customer's computer then communicates with the publishing server plug-in 220 (using the SAP received from the content server 110) to obtain a document containing information to retrieve the published application. To open the document, the customer's computer launches the ICA client 215 and subsequently interprets the document. Using the information in the document, the customer's computer establishes a communication session with the application server 205 to view the latest version of Spreadsheet X using the ICA client 215. Thus, the employee can present the test data using the most current version of Spreadsheet X. Alternatively, the employee can only access the Spreadsheet X if the organization subscribes to the published application service.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method of providing access to a remote application to an application client or end user application comprising:
   (a) receiving, by a client, from a web service directory on a content server, a service access point associated with a first application, the service access point identifying a web server;
   (b) receiving, by the client, from the web server identified by the service access point, address information associated with the first application;
   (c) launching, by the client, a second application, the second application communicating via a presentation layer protocol with an application server identified by the received address information; and
   (d) launching, by the application server, the first application and returning information to the second application via the presentation layer protocol.

2. The method of claim 1 further comprising transmitting a query to the web service directory to search for the first application prior to step (a).

3. The method of claim 1 wherein step (a) comprises receiving the address of a web server and receiving a key for locating information associated with the first application in a database local to the first application.

4. The method of claim 1 wherein step (b) comprises receiving a MIME document including the address information associated with a first application.

5. The method of claim 1 wherein the second application comprises an application client.

6. The method of claim 5 further comprising installing the application client prior to step (c).

7. The method of claim 1 wherein the step (c) further comprises transmitting the address information to the application server via the presentation layer protocol.

8. The method of claim 1, wherein the first application comprises a GUI application.

9. A client device for use in a system for executing a remote first application provided by a service provider on a web service directory, the client comprising:
   a client browser, the client browser (a) receiving, from a web service directory on a content server, a service access point associated with the first application, the service access point identifying a web server and (b) receiving address information associated with the first application from the web server identified by the service access point; and
   an application client, the application client (a) being launched in response to the received address information, (b) communicating via a presentation layer protocol with an application server identified by the received address information to receive data from the first application; and c) launching, by the application server, the first application and returning information to the application client.

10. The client device of claim 9 wherein the received address information is included in a MIME document.

11. The client device of claim 10 wherein the MIME document is an Independent Computing Architecture file type.

12. A method of providing access to a remote application to an application client or end user application comprising:
   a) sending, by a client, a query to a web service directory on a content server for information associated with a first application;
   b) transmitting, to the client, from the web service directory, a service access point associated with the first application, the service access point identifying a web server;
   c) receiving, by the client, address information associated with the first application from the web server identified by the service access point;
   d) launching, by the client, a second application, the second application communicating via a presentation layer protocol with an application server identified by the received address information; and
   e) launching, by the application server, the first application and returning information to the second application via the presentation layer protocol.

13. The method of claim 12 wherein step (b) further comprises receiving an address of the web server and receiving a key for locating information associated with the first application in a database local to the first application.

14. The method of claim 12 wherein step (c) further comprises accessing a database local to the first application using a key contained within the service access point and having the local database return address information associated with the first application.

15. The method of claim 12 wherein step (c) comprises receiving a MIME document including the address information associated with a first application.

16. The method of claim 12 wherein the second application is an application client.

17. The method of claim 16 further comprising installing the application client prior to step (d).

18. The method of claim 12 wherein the first application is a GUI application.

19. A method of providing access to a remote application to an application client or end user application comprising:
   a) receiving, by a content server, from a client, a request to access a service access point associated with a first application;
   b) identifying, by the content server, that the requested service access point can be used with an application client;
   c) requesting, by the client, from a web server, address information associated with the first application identified by the service access point;
   d) converting, by the web server, the requested address information into a file, the format of the file associated with the application client;
   e) transmitting, by the web server, the file including the converted address information to the client;
   (f) launching by the client a second application, the second application communicating via a presentation layer protocol with an application server identified by the converted address information; and
   (g) launching by the application server the first application and returning information to the second application via the presentation layer protocol.

20. The method of claim 19 wherein the service access point is identified in a web service directory.

21. The method of claim 19 further comprising transmitting the application client to the client.

22. The method of claim 19 further comprising sending, by the client, a query to a web service directory for information associated with a first application.

23. The method of claim 19 further comprising transmitting to the client from a web service directory the service access point associated with the first application, the service access point identifying a web server.

24. The method of claim 19 further comprising launching by the client an application client, the application client communicating via a presentation layer protocol with an application server identified by the received address information.

25. The method of claim 19 further comprising receiving an address of the web server and receiving a key for locating information associated with the first application in a local database.

26. The method of claim 19 further comprising accessing a local database using a key contained within the service access point and having the local database return address information associated with the first application.

27. The method of claim 19 wherein step (c) comprises receiving a MIME document including the address information associated with a first application.

28. The method of claim 19 further comprising installing the second client on the client.

29. The method of claim 19 wherein the first application is a GUI application.

30. The method of claim 19 wherein the second application is a GUI application.

* * * * *